(No Model.)
H. C. SPALDING.
ANTI INDUCTION ELECTRICAL CABLE.
No. 327,488. Patented Sept. 29, 1885.
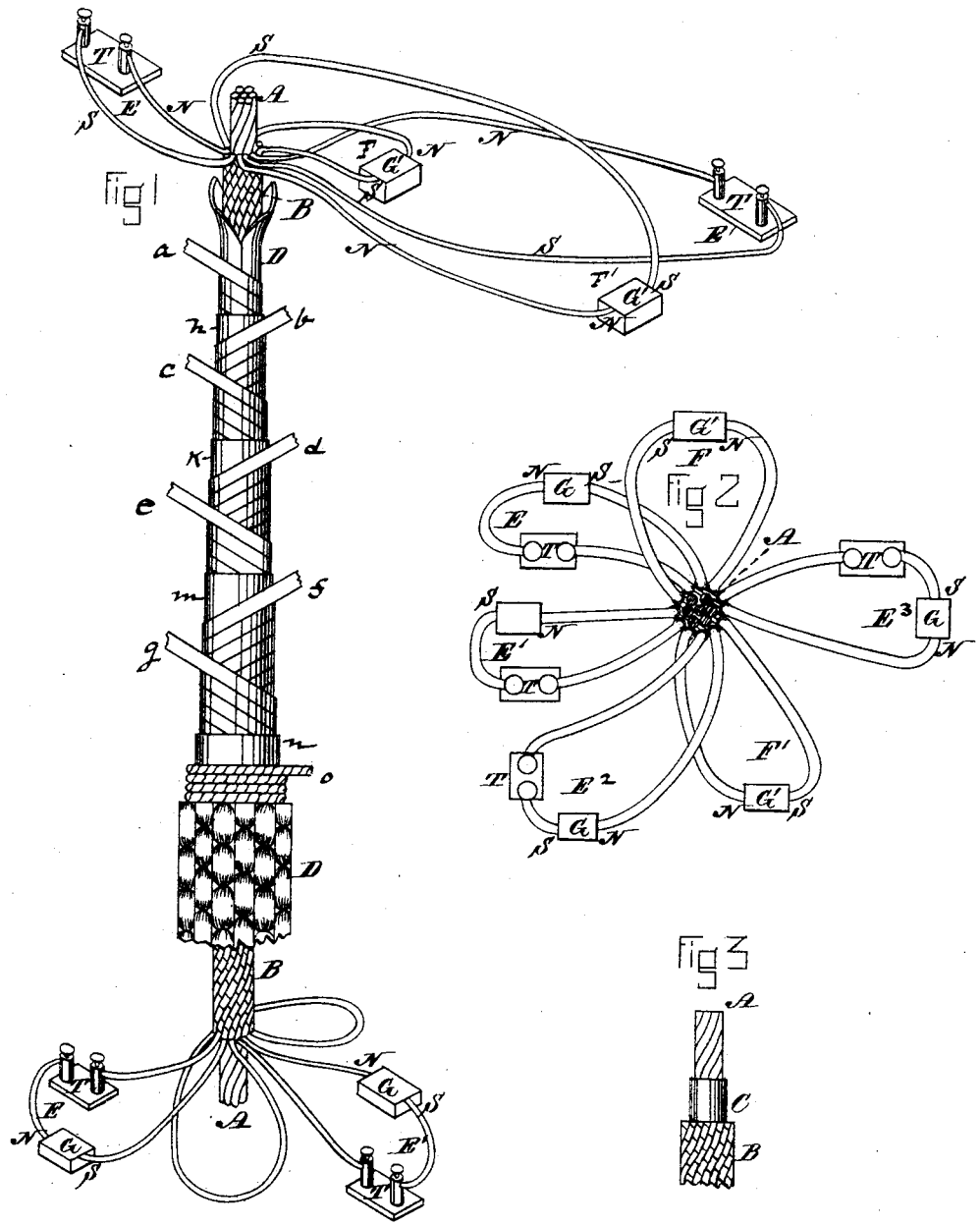
WITNESSES
INVENTOR
Henry C. Spalding

UNITED STATES PATENT OFFICE.

HENRY C. SPALDING, OF BOSTON, MASSACHUSETTS.

ANTI-INDUCTION ELECTRICAL CABLE.

SPECIFICATION forming part of Letters Patent No. 327,488, dated September 29, 1885.

Application filed April 1, 1884. Renewed February 28, 1885. (No model.)

*To all whom it may concern:*

Be it known that I, HENRY C. SPALDING, a citizen of the United States, and a resident of Boston, in the county of Suffolk and State of Massachusetts, have invented certain new and useful Improvements in Anti-Induction Electrical Cables, of which the following is a specification, reference being had to the drawings accompanying and forming a part of the same.

My invention relates to electrical cables containing the conductors of two or more independent circuits; and it consists in improvements in the construction of the cable, and also in a novel method of using or working the wires contained in the same, whereby electrical inductive disturbances are obviated.

The independently-insulated conductors of my improved cable are laid around a central strengthening-core of twisted iron or steel wires. This plan of construction I have more fully described in other applications. If the insulated wires are laid directly upon the core, however, their protective coatings are liable to become ruptured by the inequalities in the surface of the core, and the insulation thus impaired. To obviate this I coat the core with a layer of insulating material of such character that it enters the depressions in the surface of said core, and may be smoothed or rounded off to form an even foundation for the insulated wires. This material should also be of such a character that it is soft and readily applied by a brush or similar means when it is hot, but which never becomes quite hard or loses entirely its plasticity. Over this I lay a given number of insulated wires, either straight or spirally, and these I inclose in an insulated covering, in which I wind at the proper steps in its application one or more metallic sheaths or screens.

I use two adjacent wires of the group for each circuit. Between each pair of adjacent wires I leave what I term an "idle" wire, and the number of circuits or idle wires for the purposes of my invention should be an even one. The wires of the circuits, or those which I term "active" wires, are connected to the poles of the sources from which they are supplied with electricity in reverse order—or, in other words, so that the positive wires of any two adjacent circuits lie next to the idle wire that is interposed between said circuits, and the same for the negative wires.

The idle wires I connect up in circuits by themselves, and in each of said circuits I insert a generator capable of producing a practically-continuous curernt. I arrange the source of electricity in these circuits in such manner that a positive idle wire lies between two negative active wires, and vice versa.

This method of constructing and using the cable is productive of many advantages. Rapid working or telephoning without the usual drawbacks of interference from induction and retardation is rendered possible, which results I attribute to the disposition of the positive and negative wires of the several circuits, by which induction is lessened to the presence of the idle wires, forming complete circuits between wires in which the currents are flowing in the same direction, and to the flow of a continuous current in the idle wires in the opposite direction to those in the adjacent wires by which the intermittent currents in the active wires are assisted, while reactive effect upon the intermittent currents from their inductive action upon the idle wires where a current is already flowing is less than would be the case had they to induce currents in a wire in which none was passing.

By inclosing the system of conductors in one or more insulated metal screens I protect them also from the earth's influence.

I will now describe my invention, by reference to the accompanying drawings. Figure 1 is a view of a part of the cable, showing a portion of each layer and the general disposition of circuits. Fig. 2 is a diagrammatic representation of the circuits. Fig. 3 is a view in detail of the core with portions of each layer exposed.

A is the central core, composed of twisted iron or steel wires. C is the layer or coating of insulating material surrounding the core, and B are the insulated conductors laid spirally upon this layer. Over the conductors B, I apply two opposite strips, D, of caoutchouc, gutta-percha, soft paper saturated with an insulating compound, or a like material, to form a smooth and even surface upon which to form the outer layers of the cable. Around the material D, I then wind spirally a strip, $a$, of paper, and on this I lay a coat of resinous varnish $h$. I then wind over this a layer of metallic foil, $b$, and proceed in like manner to form the outer layers of paper, $c\ e\ g$, the layers of metal foil $d$ and $f$, and the coats of varnish $k\ m$. Around the paper $g$, I apply a layer of bituminous varnish, $n$, in which I wind a serving of hemp twine, $o$, and around this I form the protective jacket or armor D.

The special composition and method of applying the insulating and protective layers, it may be observed, is capable of great variation. I have, however, described a very economical and useful plan of protection invented by me and described in other applications.

Assuming that the cable thus constructed has twelve insulated conductors around the core A. With these I form four active and two idle circuits, one wire of the latter being between each of the four pairs of wires that form the active circuits. Let E E′ E² designate the active circuits, in each of which there is a generator, G, and two or more translating devices, T T. The conductors of circuit E are connected to the generator, the right-hand conductor, Fig. 2, to the negative and the left-hand wire to the positive binding-post. The conductors of the next circuit E′ are connected in reverse order—that is, that nearest to the positive wire of circuit E being connected to the positive pole of its generator, and so on for all the remaining wires. In the idle circuits F F′ the wires are connected with the generators G′, so that a negative wire comes between the positive active wires, and so on.

The number or disposition of the translating devices may be greatly varied, nor do I confine myself to any particular arrangement of the conductors; but

What I claim is—

1. In an electrical cable, the combination, with a central core and two or any even number of pairs of insulated conductors laid thereon and forming complete or round wire circuits, of insulated idle conductors interposed between said pairs and connected in circuits, substantially as set forth.

2. The combination, with the central core of an electrical cable and two or other even number of pairs of insulated conductors forming complete or round wire circuits, of insulated idle conductors interposed between said pairs and connected in circuits and electrical generators included in said circuits, substantially as set forth.

3. The combination, with the central core of an electrical cable, and two or more pairs of insulated conductors forming complete or round wire circuits, of generators connected with said circuits in reverse order in substantially the manner set forth.

4. The combination, with the central core of an electrical cable and two or more pairs of insulated conductors forming complete or round wire circuits, of generators connected with said circuits in reverse order and insulated idle conductors interposed between said circuits in substantially the manner set forth.

5. The combination, with the central core of an electrical cable and two or other even number of pairs of insulated conductors forming complete or round wire circuits, of generators connected in reverse order with said circuits and insulated idle conductors interposed between the pairs of conductors and connected up in circuits in substantially the manner described.

6. The combination, with the central core of an electrical cable and two or other even number of pairs of insulated conductors forming complete or round wire circuits, of generators connected in reverse order with said circuits, idle conductors interposed between the pairs of conductors and connected in circuits, and generators connected with said circuits in such manner that the current in the idle wires may flow in an opposite direction to that of the currents in the adjacent active conductors, substantially as and for the purpose set forth.

In testimony whereof I have hereunto set my hand this 29th day of March, 1884.

HENRY C. SPALDING.

Witnesses:
S. H. DUDLEY,
W. P. DUDLEY.